United States Patent [19]

Johnson et al.

[11] Patent Number: 4,850,405

[45] Date of Patent: Jul. 25, 1989

[54] LOG DELIMBING AND CUTOFF DEVICE

[76] Inventors: Ernest W. Johnson, P.O. Box 66, Frenchtown, Mont. 59834; John W. Johnson, 100 N. Johnson Hwy. #3, Missoula, Mont. 59801; David C. Pontrelli, 104 Shelby Ct., Missoula, Mont. 59803

[21] Appl. No.: 182,396

[22] Filed: Apr. 18, 1988

[51] Int. Cl.⁴ .............................................. B27L 1/00
[52] U.S. Cl. .................................. 144/2 Z; 144/3 D; 144/338; 144/343
[58] Field of Search ................... 144/2 Z, 3 D, 208 P, 144/208 E, 343, 338

[56] References Cited

U.S. PATENT DOCUMENTS 4,620,578  11/1986  Verrill et al. ...................... 144/2 Z Primary Examiner—W. Donald Bray
Attorney, Agent, or Firm—Keith S. Bergman

[57] ABSTRACT

A wheeled trailer provides carriage for a delimbing member having associated means to move a log therethrough and a cutoff member to cut delimbed logs to merchandizable lengths. The vehicle is propelled by a separate tractor and logs are presented to and removed from the mechanism by separate log handling devices. The vehicle is of small simple, rugged, durable nature to accommodate Western logging on rough and rugged terrain. The delimbing and cutoff members are pivotally mounted on the vehicle, and pivotally interconnected to each other to require parallel orientation so that delimbed logs are cut to length substantially perpendicularly to their axis. Log cutting is accomplished by a chain-type saw.

4 Claims, 2 Drawing Sheets

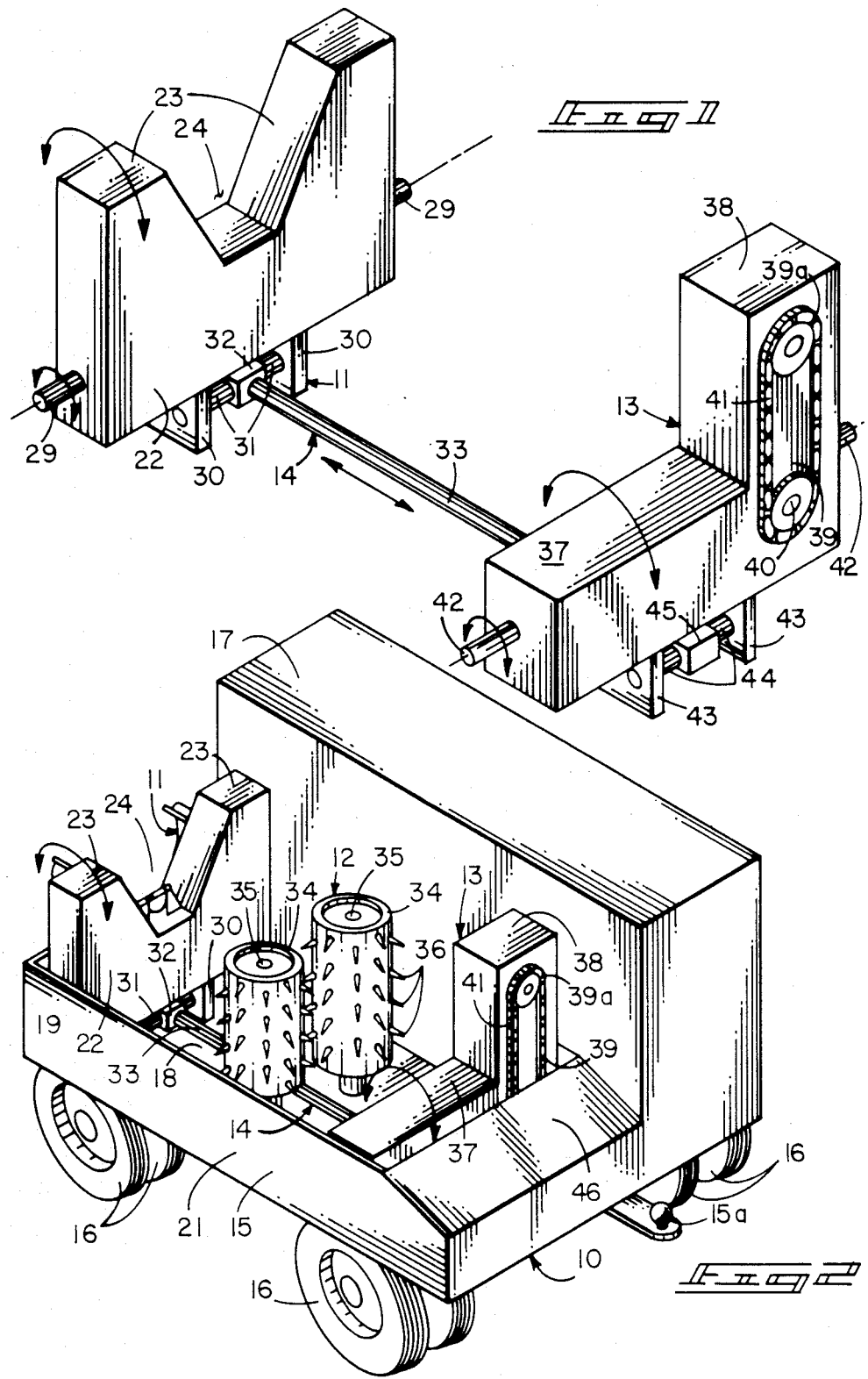

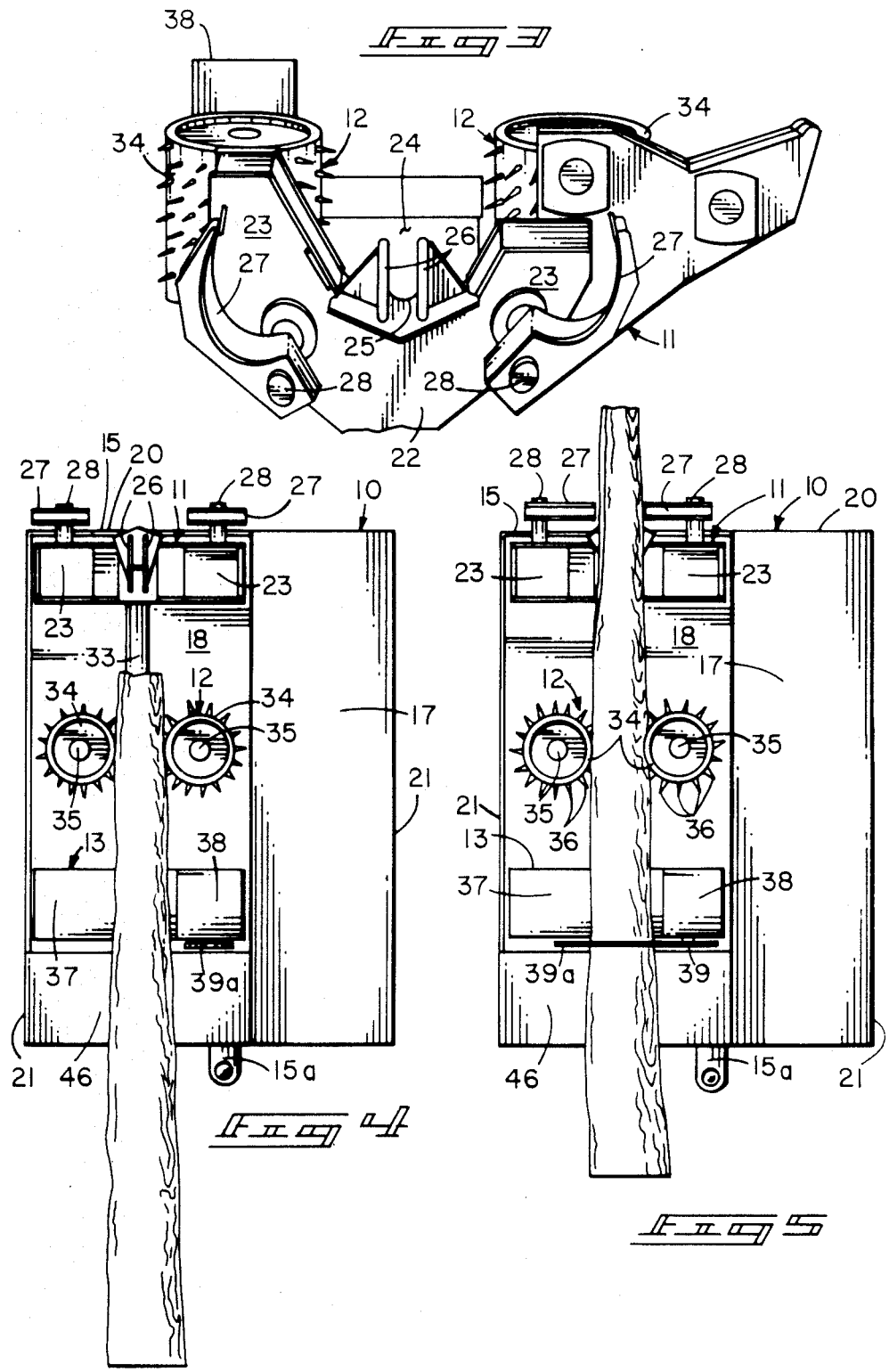

LOG DELIMBING AND CUTOFF DEVICE

BACKGROUND OF INVENTION

1. Related Applications

There are no applications related hereto heretofore filed in this or any foreign country.

2. Field of Invention

Our invention relates generally to a a log delimbing device and more particularly to such a device that is of simple, rugged nature to function under Western logging conditions and has means to cut trees to predetermined length perpendicularly to their axis.

3. Background and Description of Prior Art

The economics of the logging industry, especially in the Western part of the United States, have become increasingly competitive and have generally tended to require increased mechanization of logging operations for the economic survival of its practitioners. Part of that mechanization has been directed to the delimbing and sectioning of cut trees. The instant invention provides a novel mechanism for this operation.

Many and various devices for delimbing and sectioning logs have heretofore come to be known. In the course of their development, however, they have become increasingly complex and sophisticated, so that in the modern day such devices come to a state wherein they violate their essence, and they merely increase the overall cost of logging rather than lessen that cost. Many such devices in the modern day provide a complete logging machine that cuts trees, delimbs them, cuts them into logs, decks them and handles the logs during and ancillary to all of these operations. Such machines normally will not replace ordinary bulldozers, heel booms and other mechanisms traditionally used in logging, so that ultimately they must be added as additional items to the already existing inventory of logging machinery merely to add to the total cost of capital invested in the operation. This additional investment oftentimes is in excess of $100,000 for such logging machines.

The instant mechanism seeks to provide a smaller, more durable machine that is adapted only to the delimbing of trees and the cutting of those trees into acceptable log lengths. In so doing, we seek to maintain the economy of the device by providing a mechanism that lessens rather than increases the overall logging cost by making use of other existing logging equipment to perform functions that it can economically perform rather than duplicating those functions of that other equipment.

As the sophistication of delimbing devices has increased, so proportionately has the mechanical complexity of such mechanisms. Many delimbers of the present day are self-powered and provide complex articulating frames or frame portions involving massive structures that require substantial amounts of power for their operation and locomotion. In logging in the Western part of the United States, the terrain on which the operation is conducted is generally mountainous, steep and rocky. Complex and compound delimbing devices are not at all amenable to efficient operation in this sort of environment. Commonly where such machines are self-powered, they have insufficient power to be mobile in all areas where needed and sufficient self-generated power cannot be economically provided. Again commonly, the complexly sophisticated and compounded devices do not have appropriate ruggedness and durability to be efficiently operable to fulfill their purposes, and commonly, they require so much substantial and costly maintenance as to make them uneconomical. The instant invention seeks to avoid these problems by providing a delimbing device on a trailer-type vehicle without means of self-propulsion. The device provides essentially a peripheral shell on which logs are contacted and supported so that only necessary operative elements are exposed and all other operative mechanism and structure is protected by this external shell. The vehicular carriage of the device is relatively small so that it may be readily moved with other logging apparatus, such as a bulldozer, heel boom or truck, and it also is compactly shaped so that its size and configuration allow it to be moved in almost any type of rocky, mountainous terrain where it may be required to operate.

Commonly in present logging practice, after a tree is cut and delimbed the entire tree trunk is too long to provide a merchandizable log, so that that tree trunk must thereafter be cut into logs of commercially acceptable lengths for merchandising. In general in the past, this sectionizing of a tree trunk into commercial logs has been accomplished by manual operation, separate and apart from the delimbing process, though in some delimbers means have been provided in association with the device to sectionize a delimbed tree trunk. Generally in cutting a tree trunk to form commercial saw logs, it is desirable that the end cuts be substantially perpendicular to the axis of a log, or at least perpendicular to a lineal element of the trunk surface when tree taper be taken into account. This desired result has in the past presented problems when logs are cut by many delimbers, as commonly in the delimbing process a tree trunk, oftentimes more than one hundred feet in length, may assume differing attitudes relative to a delimber's frame and log support structure during different portions of the delimbing process, merely because of the nature or the delimbing device itself and of the delimbing process. In sectionizing such a tree trunk with a cutting device carried by the delimber, a cut has not necessarily been made perpendicular to the tree axis and if it is not, wood oftentimes may be wasted and the log ultimately cut is of less value.

Our invention seeks to resolve this problem by providing both a delimbing mechanism and a cutting mechanism that are pivotally mounted relative to their supporting frames, with additional linkage pivotally intercommunicating between the two mechanisms to maintain them constantly in a parallel relationship, with a log being delimbed extending substantially perpendicular therebetween at all times during the delimbing process. A typical chain saw is pivotally carried by the cutting mechanism to efficiently cut a tree trunk substantially perpendicular to its axis, at least within allowance for log taper. Prior art devices generally have not necessarily made such a perpendicular cut in sectioning trees and commonly have not used chain saw devices for making that cut.

Our invention resides not in any one of these features or improvements per se, but rather in the synergistic combination of all of them to provide the functions necessarily flowing therefrom as hereinafter more fully described and claimed.

SUMMARY OF INVENTION

Our invention generally provides a wheeled trailer-type vehicle to operatively support a delimbing member and a cutoff member for locomotion. The trailer supports operating mechanism, covered by a peripheral protective shell, in one lateral portion of the trailer. The delimbing member and cutoff member are each pivotally supported in the other lateral portion, in spaced tandem array, with log moving means therebetween. The delimbing member and cutoff member provide two-point support for a log and are mechanically interconnected to require the two members to maintain a parallel relationship during operative pivotal motion. The trailer has no self-propulsion means but provides hitch means for interconnection with a propelling vehicle. The cutoff member provides a chain saw-type blade that moves from a protected null position to cut a tree into commercial log lengths with cuts substantially perpendicular to the tree axis.

In providing such a device, it is:

A principal object of our invention to create a delimbing and cutoff device for logging that is of relatively small, simple, rugged nature, that is externally propelled, and that is serviced by other mechanism for moving cut trees thereto for delimbing and cut logs therefrom for decking.

A further object of our invention to provide such a device that is trailer mounted so that it may be readily moved in rocky, mountainous terrain encountered in many logging regions, especially those in the Western cordilleran area.

A further object of our invention to provide such a machine that has pivotally mounted delimbing and cutoff members that are mechanically interconnected to constrain both members to parallel motion relative to each other so that cuts made in a delimbed tree trunk supported by those members are substantially parallel to the axis of that tree trunk.

A still further object of our invention to provide such a device that has means for moving a log through the delimbing and cutoff mechanism which are powered by a motor carried by the vehicle.

A still further object of our invention to provide such a delimbing device that is so configured as to allow simple and easy access for tree insertion and log and debris removal.

A still further object of our invention to provide such a device that is of new and novel design, of rugged and durable nature, of simple and economic manufacture and one otherwise well suited to the uses and purposes for which it is intended.

Other and further objects of our invention will appear from the following specification and accompanying drawings which form a part hereof. In carrying out the objects of our invention, however, it is to be understood that its essential features are susceptible of change in design and structural arrangement with only one preferred and practical embodiment being illustrated in the accompanying drawings as is required.

BRIEF DESCRIPTION OF DRAWINGS

In the accompanying drawings which form a part hereof and wherein like numbers of reference refer to similar parts throughout:

FIG. 1 is an isometric view of the delimbing and cutoff structures, removed from their mounting vehicle, to show their pivotal mounting and mechanical interconnection.

FIG. 2 is a partially cut away isometric surface view of our delimbing mechanism showing its various elements, their configuration and relationship.

FIG. 3 is an isometric view, taken from the front looking rearwardly, of the delimbing mechanism of our invention.

FIG. 4 is an orthographic top or plan view showing a tree being delimbed in our mechanism.

FIG. 5 is a view of the same device as illustrated in FIG. 4 with another tree further advanced in the delimber and being cut to log length.

DESCRIPTION OF THE PREFERRED EMBODIMENT

Our invention generally provides trailer-type vehicle 10 carrying delimbing member 11, log moving member 12 and cutoff member 13 with linkage 14 interconnecting the delimbing and cutoff members to constrain their parallel relationship.

Vehicle 10 provides a trailer defined by a peripheral frame 15 carrying similar depending wheel trucks 16, in the instance illustrated four in number and located at each corner, for locomotion. The trailer structure is not remarkable, is generally known in similar prior art vehicles and is therefore not described in any particular detail.

The vehicle structure should be heavy enough to support the loads, stresses and strains that are required of it to be supported in its normal operation and the entire structure should be of a unitary nature and not any larger than necessary to aid its locomotion over steep, rocky terrain. The vehicle provides hitch structure 15a at at least one end to provide means for releasable interconnection with a separate prime mover (not shown). The operative mechanism of our device, and particularly its motor, is carried along a first lateral edge of the trailer and covered for protection by peripheral shell element 17. The delimbing and cutoff of our device are carried above table 18 defined along the second lateral side of the vehicle. The vehicle frame provides extending above table 18 by auxiliary peripheral elements 19, which structurally interconnect with the frame to provide mounting means for operative mechanism of our invention.

This structure is generally known and does not comprise any part of our invention, per se, but only provides an appropriate operative mechanism and environment in which our invention exists.

Delimbing member 11 comprises rigid yoke-like frame having lower base portion 22 interconnecting spaced upstanding lateral legs 23 defining medial channel 24 therebetween with upwardly and outwardly sloping sides to aid in positioning a log to be delimbed medially therein. This structure in its lower forward part, as shown in FIG. 3, carries medial "U" shaped knife 25 and associated guide structure 26 to cut the top from a tree and similar spaced curvilinear knives 27 to cut the limbs therefrom. The curvilinear knives are mounted on forwardly extending, horizontally oriented axles 28 journaled in base portion 22 of the delimbing member. The knives are movable, by mechanism not shown, from an open or relaxed position as illustrated in FIG. 3, to an operative position immediately adjacent a tree trunk to be delimbed. This type of delimbing structure is not new or remarkable and has heretofore been disclosed in general, as epitomized by U.S. Pat. No. 3,840,058 issued to Menzel, et al., on Oct. 8, 1974.

Delimbing frame 22, 23 is pivotally mounted in appropriate journals on auxiliary peripheral frame element 19 by horizontal, laterally extending axles 29 carried in axial alignment in a lower position on each side of delimbing member 11. These axles and their pivotal mounting allow the delimbing member to pivot from the vertical to accept an elongate tree trunk with an orientation substantially parallel to that tree trunk's axis, whatever the orientation of the tree trunk in the delimbing operation. This tree orientation allows better delimbing of the trunk as curved knives 27 will be substantially symmetrically located relative thereto to cut limbs immediately adjacent the trunk structure and substantially parallel thereto. The delimbing member frame illustrated is of a unitary construction and though other forms of construction may be used for this frame, all must provide a rigid, structurally intercommunicating member that moves and operates as a unitary structure whether it be compound or simple in nature.

Similar spaced structurally interconnected ears 20 depend from the laterally medial lower portion of delimbing member 11 to provide support for laterally extending horizontal axle 31, which allows pivotal interconnection with cutting member 13. Axle 31 pivotally carries medial collar 32 which in turn carries the forward end of rearwardly extending connecting rod 33. Axle 31 is oriented parallel to mounting axles 29 to provide the motion required for the delimbing member.

Log moving mechanism 12 comprises two spaced, laterally opposed, vertically orientated cylinders 34 mounted above table 18 of vehicle 10 in a medial position between the delimbing member and cutoff member. The cylinders 34 are carried upon vertical axles 35 that are powered, through appropriate mechanical interconnecting linkage, by a motor (not shown) carried by the vehicle. The cylinders carry a plurality of spacedly arrayed, radially projecting spikes 36 to aid in engaging a log and moving that log between them. The axles 35 are mounted for lateral motion away from each other but biased to an inward position to allow accommodation of various sizes of tree trunks therebetween while yet maintaining appropriate engagement with those tree trunks to move them in an elongate fashion relative to vehicle 10 and the delimbing member and cuttoff member carried thereby. This log moving structure is not novel per se and is disclosed by the Menzel patent, supra, amongst others. This particular structure illustrated and described is not essential to our invention and other mechanisms known for the same purpose of moving logs in an elongate direction therethrough may serve the purposes of our invention, if not so well. Another structure commonly used for such purposes provides two opposed vehicular tires mounted on spaced vertical axles that are biased toward each other but movable against their bias, and other mechanisms are known.

Cutoff member 13 provides an "L" shaped structure having base 37 interconnecting upwardly extending saw mounting arm 38 in its inner end portion. Chain saw blade 39 is mounted on axle 40 in the lower inner portion of the base member. This mounting of the chain saw blade is of a pivotal nature so that the slave end 39a of the blade may pivot downwardly and laterally outwardly while the saw is being operated so that chain 41 cuts a log in its path. Upwardly extending saw arm 38 serves to protect the chain saw blade when it is in its normal unextended or null mode, as illustrated in FIG. 1, from damage from logs moving through or about the delimbing device when the saw is not operative. This type of cutoff chain saw again is not remarkable is heretofore known per se in the prior art, and constitutes a part of our invention only as a combinational element.

Base 37 of cutoff member 13 is pivoted upon horizontal, axially coincident axles 42 extending a spaced distance laterally from either end of the base member. These axles are journaled in vehicle frame portion 19 to allow the cutoff member to pivot from a vertical position in a forward and rearward direction about this axis. The lower surface of base 37 carries similar spaced depending connecting ears 43 supporting axle 44 therebetween in a position parallel to the axis of axles 42. Axle 44 journals connector sleeve 45 which interconnects with the forward end of connector rod 33.

This connecting linkage 14 then, providing connecting rod 33 extending between sleeve 33 in its forward part and sleeve 45 in its rearward part, establishes a pivotal mechanism requiring delimbing member 11 and cutoff member 13 to pivot relative to vehicle 10 in similar parallel relationship to each other. This feature is essential to our invention as it maintains the cutoff member substantially parallel to the axis of a tree to be cut, so that a cut made in that tree will be substantially perpendicular to the tree axis, or more exactly, perpendicular to a linear element of the tree trunk extending between support points on the delimbing and cutoff members.

All of the various elements of my invention described are preferably formed of metal for appropriate durability and rigidity. All elements should present a simple continuous, external surface, as illustrated, though they may by their nature be formed in a compound fashion with an internal frame supporting peripheral elements. Preferably if a compound structure is used, any mechanical joinder of adjacent surfaces of the various elements forming a compound member is rigid and formed by welding or the like. To be effectively operable, our invention must have a rugged durability that is provided only by simple, strong, rigid construction. Various pivotal elements described that are to move relative to each other are journaled in traditional bearing structures of appropriate rigidity, according to practices and designs heretofore well known in the mechanical arts.

Having thusly described the structure of our invention, its operation may be understood.

Firstly, a mechanism is formed according to the foregoing specification and moved by some appropriate prime mover, such as a bulldozer (not shown), to the area where the device is to be used. Its use will be associated with other standard equipment commonly used in present day Western logging, normally a so-called "heel boom" to move logs and a bulldozer to move the delimber and aid in moving logs and debris, when necessary. Such auxiliary apparatus is normally available in any logging operation and its use in association with the instant invention allows the invention to be of more simple nature and perform only delimbing and cutoff functions, whereas other present day devices for the same purposes have generally provided tree cutting, tree and log moving and other functions that may be better, or at least equally as well, accomplished with existing associated logging apparatus. The simplified function of the instant invention makes it more economical to produce in the first instance and secondarily allows the use of other existing machines that normally would not be used and would not provide any benefit in a logging operation with the more complex-type delimbing devices that provide the same functions.

To delimb a tree, it is moved by a heel boom with grapple and placed with its butt in channel 24 of delimbing member 11. The tree is then moved by the heel boom forwardly through that channel until it contacts log moving mechanism 12. Simultaneously, delimbing knives 27 will be activated to move inwardly about the tree trunk so that as the trunk moves past these knives, its limbs are cut or broken immediately adjacent the trunk. Separate hydraulic mechanism that is powered by the prime mover controls these knives, as disclosed in the Menzel patent supra. As the butt of a tree contacts log moving mechanism 12, that mechanism engages on the diametrically opposed external surface portions of a tree. Cylinders 34 are then powered to rotate so as to move a tree they engage forwardly and their movable mounting and bias maintain contact with that tree to move it in that direction. As this occurs, the tree is pulled through the delimbing knives and the limbs are cut or broken from it and deposited substantially beneath the delimbing knives. As soon as the log is contacted by the cylinders of the log moving mechanism, the heel boom previously moving that log is disengaged from it and the log motion thereafter controlled entirely by the log moving mechanism.

In performing the delimbing operation, it should be noted that delimbing member 11 will be mounted on a trailer which commonly will cause that member to be above the level of the ground upon which a tree to be delimbed is supported. With this situation, when the butt of a tree is placed in the delimbing member, the tree will be angled in the earth and to the trailer. The delimbing member will pivot forwardly at its top to accommodate this angulation of a supported tree. Similarly as the delimbing operation proceeds, this angle will change until at some point in the delimbing process, the tree will cease to be supported on the ground and will rest substantially horizontally between the delimbing member and the cutoff member. The lower surface of channel 24 of the delimbing member is preferably substantially at the same horizontal level as the upper surface of base 37 of the cutoff member so that when a tree is supported by these two members, it normally will be substantially horizontal or at least at substantially the same orientation to the earth as the bed of vehicle 10. This particular delimbing motion is used in operating the medial "U" shaped topping knife 25, as when a tree progresses through the delimbing mechanism, its top ultimately will tip downwardly, by reason of gravity action and its cantilevered support, and will be cut off by that knife, normally at a diameter of about 3 inches or thereabouts.

In the logging industry, it generally is desirable that logs be of certain lengths for merchandising and it also is necessary in general to cut a tree trunk into shorter logs to allow its haulage over existing roads. Commonly, desirable log lengths correspond substantially to the length of lumber to be cut from a log, such as 8, 12, 14 and 16 foot lengths or multiples thereof. To accomplish such cutting with our invention, a log is moved forwardly through the device to an appoprate position so that the log is opposite chain saw blade 39 at a position where it is to be cut. The saw blade is then activated to operate its chain and to move its upper slave end downwardly against a log. This motion is continued until a cut is effected. During the cutting operation, the log will be supported on the upper surface of base 37 of the cutting member and against or immediately spacedly adjacent the inner vertical surface of upright arm 38 to make a cut substantially perpendicular to the log axis.

Chain saw blade 39 is operated by manual control of an operator with mechanism heretofore known and therefore not shown in detail. Obviously, the operation of the saw could be automated, if desired, to automatically cut logs to certain lengths, but in general, this is neither necessary nor desirable as a log length may vary from a predetermined value in individual cases in order to produce the highest and best yield of lumber.

The forward portion of a log cut from the rest of a tree trunk will be substantially unsupported after its cutting and it will therefore move forwardly, laterally, or both from the device to be deposited on the adjacent ground from whence it may be moved by an ordinary heel boom for decking, loading or other disposition. The downwardly and forwardly angling surface 46 of our device aids log disposition in this fashion and if desired, the surface may also slope laterally downwardly.

The foregoing description of our invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described our invention, what we desire to protect by Letters Patent and what we claim is:

1. A mechanism for delimbing and cutting a tree trunk into logs of predetermined length, comprising, in combination:
   a trailer-like vehicle defined by a peripheral frame having a front, back and spaced opposed sides with depending wheels for locomotion and operative mechanism including a motor carried along a first side with a peripheral covering about the operative mechanism;
   A delimbing member, having a rigid yoke-like frame with a base portion structurally carrying spaced upwardly extending lateral legs to define a medial channel to receive and support a tree trunk, mounted in the rearward part of the second side of aforesaid vehicle, for forward and rearward pivotal motion relative thereto;
   a cutoff member, having a base and an upwardly extending saw arm mounting a chain saw blade for pivotal motion from a vertical position downwardly to said base member, said blade being pivotally mounted in the forward part of the second lateral side of aforesaid vehicle, for forward and rearward pivotal motion about an axis parallel to the pivotal axis of the delimbing member, aligned with and spacedly forwardly adjacent the delimbing member to receive a log passing therefrom;
   rotating cylindrical means for moving a log in an elongate direction carried by the vehicle between said delimbing member and said cutoff member; and
   mechanical means interconnecting the delimbing member and the cutoff member to constrain a parallel relationship between said members.

2. The invention of claim 1 wherein the mechanical means connecting the delimbing member and the cutoff member comprise:
   a first laterally extending axle parallel to the pivotal axis of and depending from the medial portion of the delimbing member;
   a second laterally extending axle, parallel to the first axle and to the pivotal axis of the cutoff member, depending from the medial portion of the cutoff member;

connecting sleeves journaled upon each of said first and second depending axles; and a rigid rod interconnecting said connecting sleeves.

3. In a trailer mounted delimbing and cutoff device for logging, of the type having a peripheral frame supporting powering means and a delimbing structure aligned with and spacedly adjacent a forward cutoff structure with log moving means therebetween, the invention comprising:

the delimbing member having tree support means pivotally mounted on the trailer for forward and rearward pivotal motion;

the cutoff member having log support means pivotally mounted on a the trailer, at a spaced distance forwardly of the delimbing structure, for forward and rearward pivotal motion parallel to the delimbing structure; and connecting linkage pivotally communicating between the delimbing member and the cutoff member to constrain a parallel relationship of said members.

4. The invention of claim 3 wherein the connecting linkage comprises a first axle parallel to the pivotal axis of and depending from the delimbing member and a second axle parallel to the pivotal axis of and depending from the cutoff member, each said axle journaling a connecting sleeve and each said connecting sleeve being interconnected by a rigid rod.

* * * * *